United States Patent [19]

Beckman

[11] Patent Number: 4,512,059
[45] Date of Patent: Apr. 23, 1985

[54] CASING SIZING MEANS AND METHOD

[75] Inventor: John H. Beckman, Downers Grove, Ill.

[73] Assignee: Union Carbide Corporation, Danbury, Conn.

[21] Appl. No.: 521,590

[22] Filed: Aug. 9, 1983

[51] Int. Cl.³ .......................... A22C 7/00; A22C 13/00
[52] U.S. Cl. .......................................... 17/45; 17/1 R; 17/49; 17/41
[58] Field of Search ................ 17/41, 42, 49, 1 R, 17/45

[56] References Cited

U.S. PATENT DOCUMENTS

| 658,521 | 9/1900 | Atkinson . | |
| 1,797,137 | 3/1931 | Gochnauer | 17/49 |
| 3,264,679 | 8/1966 | Moekle | 17/33 |
| 3,457,588 | 7/1969 | Myles et al. | 17/41 |

FOREIGN PATENT DOCUMENTS 68190 1/1983 European Pat. Off. .

Primary Examiner—Willie G. Abercrombie
Attorney, Agent, or Firm—Roger Aceto

[57] ABSTRACT

A casing sizing means which comprises a plurality of petal like sizing members arranged about a central hub to form generally the shape of a truncated cone. The sizing members are normally biased towards an outward or expanded position against the inner surface of the casing. As casing moves over these members during stuffing, the contacting sizing members are pulled upright to a casing stretching position and against a stop which prevents the members from moving beyond a predetermined casing sizing position.

20 Claims, 6 Drawing Figures

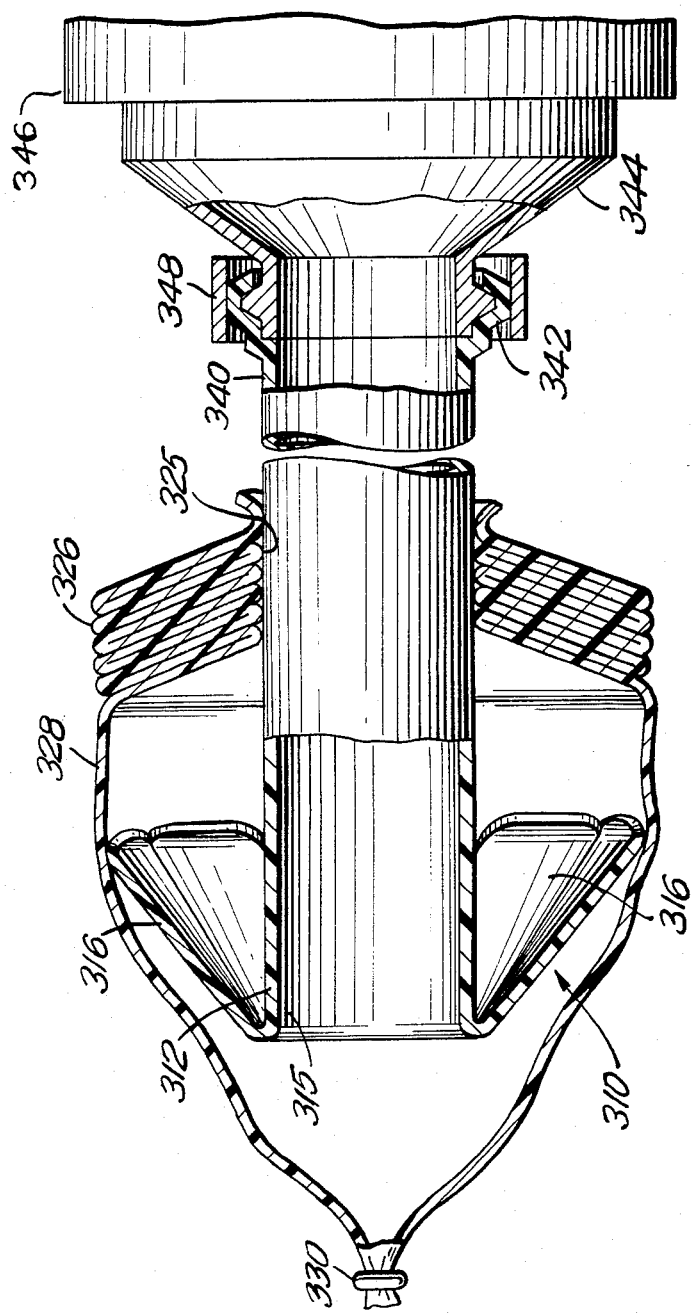

CASING SIZING MEANS AND METHOD

BACKGROUND OF THE INVENTION

The present invention relates to a sizing means and method for diametrically expanding a flexible tubular food casing just prior to the stuffing thereof. In particular, the present invention relates to an expandable sizing means together with a method for using the sizing means.

Automatic and semiautomatic techniques for stuffing food casings with a variety of food products are well known in the meat packing industry.

For production of encased products on a fully automatic basis, shirred casing is used. Shirred casing is simply a relatively long continuous length of casing of up to 200 feet or more which is shirred to a much shorter length. Other stuffing operations may use shorter, cut lengths of casing which are not shirred.

It is also common to use a casing sizing means in connection with the stuffing of larger casings which, for example may range between 50 to 200 millimeters in diameter. These casings have a relatively thick wall, often reinforced with a fibrous web. The stuffing of these reinforced casings is often facilitated by diametrically stretching the casing just prior to stuffing.

Casing sizing means as used to diametrically stretch the casing perform several important functions in connection with the stuffing operation. For example, stretching the casing to a correct diametrical size during the stuffing operation facilitates production of a stuffed casing product having a relatively uniform diameter throughout its length. This diametrical stretching can be accomplished simply by passing the casing over the sizing means and allowing the sizing means to stretch the casing to a predetermined diameter. This stretched casing diameter will be related to the manufacturer's recommended stuffed diameter for a given casing and is, or is near to, the final diameter of the stuffed product.

The friction between the casing and sizing means also creates an amount of drag or hold-back force on the casing. While this drag or hold-back, in part, contributes to the final diameter of the stuffed casing product, hold-back also determines the extent to which the casing is filled. In general, the greater the hold-back or drag on the casing, the more fully and tightly packed the casing with food product.

Regardless of the particular purpose for which the casing sizing means is used, there are times during the stuffing operation when the casing should be relatively free of the drag or hold-back force created by the sizing means. For example, during automatic stuffing operations of the larger sizes of casing, it is periodically necessary to provide an amount of casing slack, as when the stuffing apparatus is operated to gather and close the casing around the ends of the stuffed product. Reducing the drag or hold-back force on the casing in order to produce an amount of casing slack facilitates the gathering and closing operation.

Sizing means as used in stuffing of larger sizes of casing can have either a fixed diameter as shown for example in U.S. Pat. Nos. 4,007,761 and 4,335,488 or an adjustable diameter as shown in U.S. Pat. Nos. 3,457,588 and 4,202,075. The latter type, in turn, can comprise elements which are integral components of the stuffing apparatus (U.S. Pat. No. 3,457,588) or they can be attachable to the stuffing apparatus (U.S. Pat. No. 4,202,075).

The present invention is an expandable sizing means of the type which is readily attachable to the stuffing apparatus. Moreover, the sizing means is expanded to a casing stretching size by the action of the casing passing over the sizing means, so that no components are needed to force the sizing means to expand to a casing stretching size. This facilitates use of the sizing means, in that it can be easily implanted into a casing in a collapsed or unexpanded state, and then later expanded to a casing stretching size during the stuffing operation.

Thus, the sizing means of the present invention lends itself to sale either as a component of a casing article (casing plus sizing means) or as a separate item. For example, when sold as a component of a casing article, preferably together with a shirred casing length, the sizing means is simply implanted into an unshirred portion of the casing and the casing is closed over the sizing means. Since, in its collapsed state, the diameter of the sizing means is preferably smaller than the diameter of the unshirred, unstretched casing, the sizing means can be easily inserted into the unshirred casing portion.

In use, the sizing means is expanded to a casing stretching size only after the casing article is mounted to the stuffing apparatus and the stuffing operation is initiated.

When sold as a separate item, the sizing means can be used with either shirred or cut lengths of casing. When used with shirred casing, the sizing means is easily inserted into the casing and then mounted to the stuffing apparatus, or the casing can be loaded onto the apparatus followed by the sizing means. In any event, the shirred casing would be first on the stuffing apparatus since even in a fully collapsed state, the sizing means would probably not fit within the bore of a shirred casing stick.

When used with cut lengths of casing the order of mounting to the stuffing apparatus would not be critical, since the cut length would easily fit over the sizing means in its unexpanded condition.

During the stuffing operation, the sizing means is easily made to at least partly collapse so as to free casing for the gathering and closing of the casing over the ends of the product.

SUMMARY OF THE INVENTION

The present invention can be characterized in one aspect thereof by a method for diametrically expanding a food casing by the steps of:

(a) locating an expandable casing sizing means within an unshirred, substantially unstretched portion of casing, the sizing means including a hub adapted for attachment to a stuffing horn assembly and a plurality of rigid petal members spaced about the periphery of the hub, each petal member having a first end hinged to the hub and a second, casing engaging end;

(b) urging the petal members to pivot outwardly from the hub toward a casing engaging position until the casing engaging end of each petal contacts the inner surface of the casing;

(c) moving the casing to be stuffed over the contacting petal members and utilizing such movement to pull the petal members toward an over center position, thereby expanding the sizing means to a casing stretching size; and (d) positioning a stop against the petal members to prevent the movement of the petal members beyond a preset over center position during the stuffing of the casing.

In another aspect, the invention can be characterized by a sizing means which includes a hub for attachment to a stuffing horn assembly. A plurality of petal-like members are hinged to the hub for pivotal movement upward and forward from a generally reclined, non-stretching position, to a more upright casing stretching position. The petals are urged towards and against the casing by a bias means which itself is not strong enough to move the petals to a full upright casing stretching position against the resistance of the casing. Instead, the force for moving the petals to the upright casing stretching position is supplied by the casing itself which acts to pull the petals towards an over center position when passing over the petals during the stuffing operation.

DESCRIPTION OF THE DRAWINGS

FIG. 6 is a sectional view showing another embodiment wherein the sizing means is part of a cored casing article.

DESCRIPTION OF THE PREFERRED EMBODIMENTS

Figure 1:
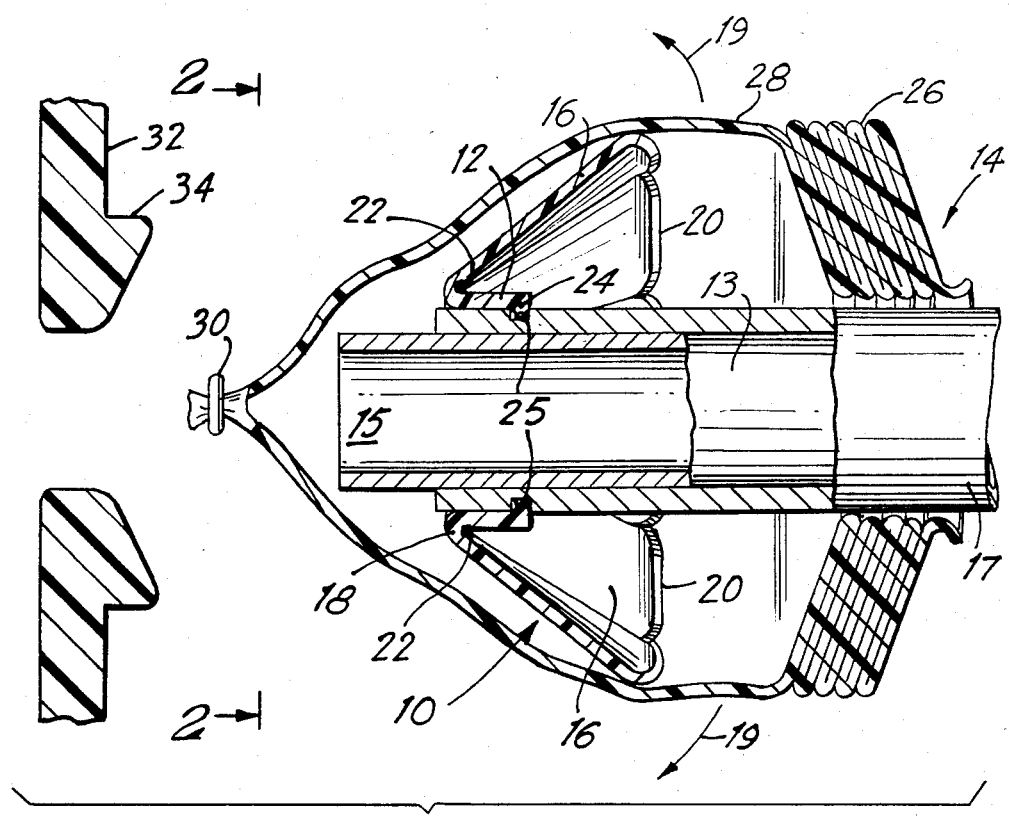
FIG. 1 is a side elevation view, partly broken away and in section, showing the sizing means of the present invention on a stuffing apparatus and within an unshirred portion of casing.
Figure 2:
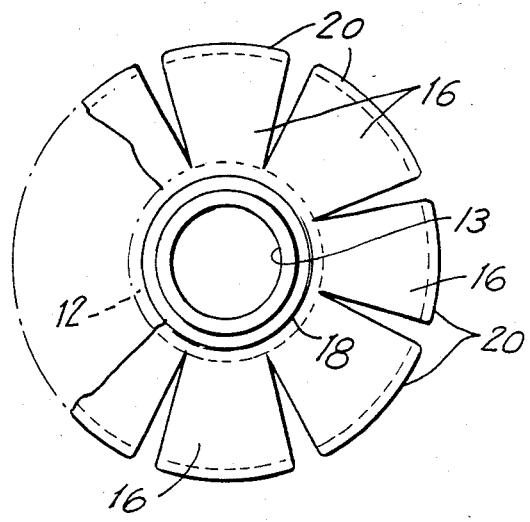
FIG. 2 is a head-on view of the sizing means shown in FIG. 1 with the casing removed for clarity.

Referring to the drawings, FIGS. 1 and 2 show the expandable sizing means of the present invention generally indicated at 10. Sizing means 10 includes a hub 12 adapted to mount on a stuffing horn assembly, generally indicated at 14. Components of the stuffing horn assembly are well known in the art and form no part of the present invention, and reference can be made to reissue U.S. Pat. No. Re. 30390 for a more detailed description of such an assembly. Accordingly, only those components of the assembly as may be necessary to an understanding of the present invention are shown.

As used herein, "stuffing horn assembly" is intended to mean the stuffing horn either alone or in combination with other elements. Thus, the sizing means of the present invention can attach directly to a stuffing horn or to a member associated with the stuffing horn depending upon the make up of the particular stuffing machine being used. For example, the stuffing horn assembly of the apparatus of reissue U.S. Pat. No. Re. 30390 would include a stuffing horn 13 having a discharge outlet 15 and a tension sleeve 17 which is slidably disposed about the stuffing horn. Tension sleeve 17 can be indexed longitudinally along the stuffing horn towards and away from discharge outlet 15.

Extending outward from hub 12 are a plurality of petal members 16. These petal members are shown in FIGS. 1 and 2 as being angled in a rearward direction, or to the right as viewed in FIG. 1, so as to give the sizing means the general appearance of a truncated cone.

Each petal member 16 has a first end 18 hinged to hub 12, and a second end 20 which is rounded and adapted to contact the casing being stretched. This second end is rounded inward so as to avoid damage to the casing which it engages.

Since sizing means 10 has the general appearance of a truncated cone, it should be appreciated that the ends 20 of petal members 16 all together, define the base perimeter of this cone shape. Moreover, since end 18 of the petals are hinged to hub 12, this base perimeter is expandable and increases as the petals pivot upward and forward to a more open position than that shown in FIG. 1. The term "forward", as used herein, is intended to mean the direction towards the discharge outlet 15 of the stuffing horn.

Preferably each petal member is hinged to hub 12 by a so-called "living hinge" made from the material of the sizing means by undercutting the material of the hub as shown at 22. This type of hinge is preferred because it has a memory which acts to bias the petals towards an open position, that is upward and forward or to the left as viewed in FIG. 1. If some other hinge or pivotal connection is used, a separate bias means must be provided to urge the petal members in this direction.

To complete the structure of sizing means 10, FIG. 1 shows that hub 12 has an internal shoulder 24 which is adapted to snap fit into a corresponding groove 25 on the tension sleeve 17.

As set out hereinabove, sizing means 10 can be sold as a separate item for attachment to a stuffing apparatus, or it can be sold together with a casing as a component of a casing article for mounting to a stuffing apparatus. For example, such a casing article, as shown in FIG. 1, will include a shirred casing length 26 having an unshirred portion 28. The sizing means 10 of the present invention will be implanted in this unshirred portion, and the unshirred casing will be closed over the sizing means by a suitable closure such as a metal clip 30.

Implantation of the sizing means is accomplished simply by closing down the petal members 16, and then inserting the sizing means 10 into the unshirred portion 28 of the casing. When released, the memory of the petal hinges will urge the petal members to a position wherein the petal ends 20 are biased against the inner surface of the unshirred casing. While this bias is sufficient to press the petal ends 20 against the casing, the bias is not strong enough to significantly expand the casing. That is, the stretch resistance of the casing is greater than the bias force exerted by the hinge connecting each petal member 16 to hub 12. Thus, even with the petal members biased against the unshirred casing 28, the casing will remain substantially unstretched.

In use, the casing article, including the casing and the sizing means 10 captured within the unshirred casing portion 28 by closure 30, is simply mounted over the stuffing horn assembly as shown in FIG. 1 until shoulder 24 snaps into groove 25. With the casing article connected to the stuffing horn assembly in this fashion, stuffing of the casing can begin.

One aspect of the present invention is that full expansion or opening of the sizing means, that is, the enlargement of the base perimeter of the cone-shaped sizing means by the outward and forward movement of petal members 16, does not occur until the casing begins to move responsive to the stuffing operation. As a food product is forcibly discharged from the stuffing horn and into the casing, the casing deshirrs from the shirred length 26 and moves off the stuffing horn assembly or to the left as viewed in FIG. 1.

This movement of the casing across the petal ends 20 works to pull petal members 16 forward and upward about the hinged ends 18 in the direction of arrows 19. As the petal members move towards an upright position, the base perimeter of the cone shape increases, which in turn stretches the casing.

Thus, the situation is created wherein the force of engagement of petal ends 20 against the casing increases so that further casing movement will continue to pivot the petal members and further expand the casing. In fact, the deshirring casing could move the petal members beyond an over-center position if the petal members were not restrained from moving to such an extreme position. Beyond the over-center position, the base perimeter of the cone shaped sizing means becomes smaller and stretch of the casing is decreased. Thus, FIG. 3 shows the sizing means in a fully expanded position during the stuffing operation, to illustrate how movement of the petal members beyond an over-center position is prevented.

Figure 3:
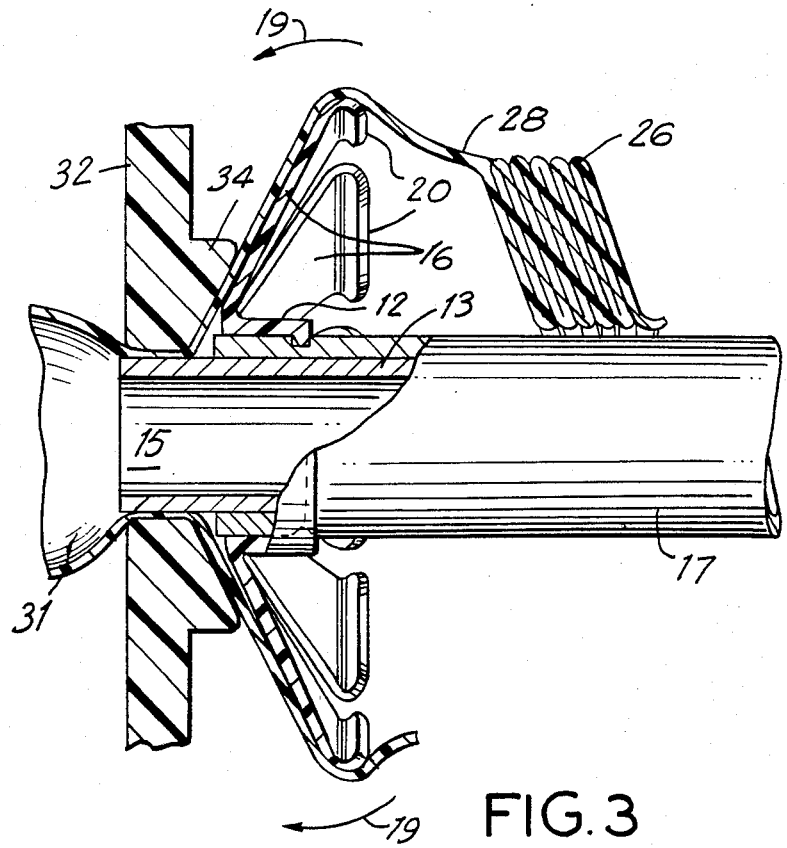
FIG. 3 is a view similar to FIG. 1, only showing the sizing means in an expanded, casing stretching position.

FIG. 3 shows a product 31 being formed by stuffing the casing 28. Also shown is a sealing ring 32 in place about the discharge outlet 15 of the stuffing horn. The function of such a sealing ring as used in the prior art is known. Reference is made, for example, to U.S. Pat. No. 4,077,090 which includes a description of the sealing ring. Briefly, sealing ring 32 serves to hold the casing 28 snugly against the outer surface of stuffing horn 13 to prevent the backflow of food product around the end of the stuffing horn. As is known in the art, this ring can be a split ring or it can be mounted for movement away from the outlet of the stuffing horn to permit mounting of the casing article.

Sealing ring 32 of FIG. 3 has still another function in connection with the present invention. It acts as a stop to prevent the petal members from moving beyond an over-center position. In this respect sealing ring 32 is put into position about the stuffing horn after the casing article is in the position shown in FIG. 1. Now, when stuffing starts, the casing will be pulled over the rounded ends 20 of the petal members and between the sealing ring 32 and stuffing horn as shown in FIG. 3. As the petal members are pulled towards an upright position by the casing passing over petal ends 20, the point is reached as shown in FIG. 3 wherein the petal members 16 become butted against a flange 34 on the sealing ring. As long as the stuffing operation continues, the petal members will be held against the sealing ring flange by the action of the moving casing.

At the end of a stuffing cycle, the operation of tension sleeve 17 will work to reduce holdback and to provide the amount of casing slack required to gather and close the casing around the end of the stuffed product. For example, moving tension sleeve 17 to the right, or away from sealing ring 32 will allow the petal members 16 to pivot in the direction shown by arrows 19 to an over-center position. This decreases the base perimeter of the cone shaped sizing means to free up the casing for movement over the sizing means.

Conversely, the tension sleeve 17 and/or the sealing ring 32 can be moved so as to pivot the petal members rearward or in a direction opposite to arrows 19. This also will decrease the base perimeter of the sizing means and free up the casing.

Figure 4:
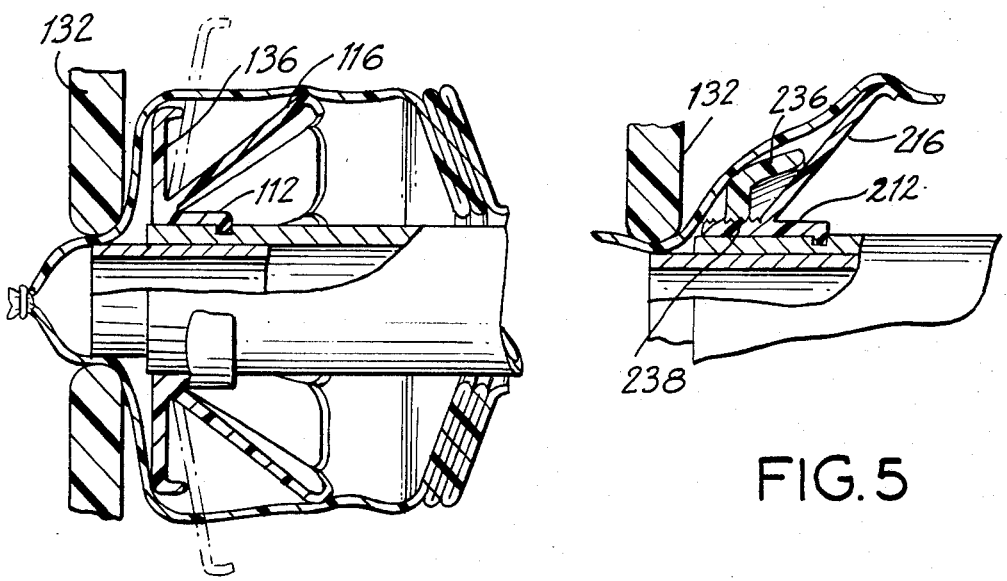
FIGS. 4 and 5 are views showing other embodiments of the invention.
Figure 5:
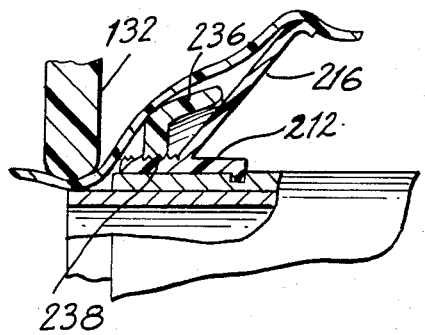

FIGS. 4 and 5 show other embodiments of the invention. In FIG. 4, sealing ring 132 is conventional both in structure and function and does not act as a stop as does sealing ring 32 of FIG. 3. In the FIG. 4 embodiment, the stop to limit the expansion of petal members 116 is formed integral the sizing means. Here, the stop is a rigid annular rim 136 which upstands from about the forward end of hub 112. When petal members 116 are in a full open position, they abut against this upstanding rim 136, as shown in dotted line in FIG. 4.

The embodiment of FIG. 5 is similar to that of FIG. 4 except that the integral stop is adjustable. In FIG. 5 the stop is in the form of a nut 236 which is threaded to a corresponding screw thread 238 on hub 212. Prior to commencing the stuffing operation, this nut 236 can be adjusted along hub 212 towards and away from petal members 216. In this fashion the desired limit of the upright or expanded position of petal members 216 can be preset so that the sizing means will not stretch the casing beyond a predetermined size.

In FIG. 6, another embodiment of the invention is shown wherein the sizing means 310 is provided as part of a tubular member which can function as a disposable stuffing horn. The expandable petal elements 316 are provided on a fore end 315 of the tube. This can be done either by making the petals integral the tubes as shown in FIG. 6 or by making them as a separate piece that is attached to the end of the tube.

Tube 312 is intended to carry a shirred casing supply 326 wherein the tube extends into the bore 325 of the shirred casing. The casing is highly compacted and in gripping engagement about the outer surface of the tube so as to increase the amount of casing which can be fit into a casing article of a given length. There are several ways of having the tube 312 inserted into the bore of the shirred casing so as to provide the gripping engagement of the shirred casing about the tube and to maximize the amount of casing in the article. For example, the shirred casing can be compressed in place on the tube. Various other methods are disclosed in a copending application Ser. No. 363,851 in the name of Mahoney et al, and assigned to the same assignee as the present invention, the relevant disclosure of which is incorporated herein by reference.

As with the other embodiments described herein, an unshirred portion 328 of the casing is drawn over the petals 316 and closed by a conventional clip closure 330.

To complete the casing article, tube 312 is shown as having its aft end 340 provided with a shoulder 342 for attachment to a stub 344 which represents the discharge of a stuffing machine (a fragment of which is shown at 346). Any appropriate means such as a snap connector or a quick release band clip as shown at 348 can be used to firmly attach tube 312 to stub 344.

In operation, the casing article of FIG. 6 is simply attached to the stub 344 of the stuffing machine as shown. No stuffing horn is needed as the tube 312 of the casing article can function as the stuffing horn. After the casing supply 326 is exhausted, the tube 312, is simply disconnected from stub 344 and a new tube with its fresh supply of casing is connected to stub 344.

In cases where the stuffing machine does have a stuffing horn, the casing article of FIG. 6 is located on the horn by sliding tube 312 over the stuffing horn and attaching the aft end 340 to an appropriate connector on the stuffing machine.

Thus, in the embodiment of FIG. 6, tube 312 not only carries a casing supply, but can also function as a disposable stuffing horn. In any case, the sizing means comprising expandable petals 316 is made part of or attached to the tube so as to provide a complete casing article including casing, casing carrier (which can function as a disposable stuffing horn) and expandable sizing means.

Thus, it should be appreciated that the present invention provides an expandable sizing means which can be easily implanted within an unshirred portion of casing. Moreover, the sizing means of the present invention is dependent upon movement of the casing for the motive force to expand the sizing means to a casing stretching size. In this regard, expansion to a casing stretching size is accomplished by the action of casing being moved over the sizing means in that such movement works to pull the expandable members of the sizing means out to a casing stretching size.

Having thus described the invention in detail, what is claimed as new is:

1. A method for diametrically expanding a food casing about the discharge end of a stuffing horn assembly during the stuffing of the casing, said method comprising the steps of:
   (a) locating an expandable casing sizing means within an unshirred, substantially unstretched portion of casing, said sizing means being attachable adjacent the discharge end of the stuffing horn assembly and including a plurality of petal members arranged about the stuffing horn assembly in generally conical configuration wherein each petal member has one end hinged with respect to the stuffing horn assembly to permit arcuate movement of said petal members upward and forward towards the discharge end and to a casing stretching position;
   (b) urging the petal members to pivot upward and forward until said petal members are at a position in contact with the inner surface of said unshirred casing but short of said casing stretching position;
   (c) moving said unshirred casing over said contacting petal members and toward said discharge end; and
   (d) pivoting said petal members to said casing stretching position in direct response to said casing movement.

2. A method as in claim 1 including the step of positioning a stop against said petal members to prevent the pivotal movement thereof to an over-center position beyond said casing stretching position during the stuffing of said casing.

3. A method as set forth in claim 1 wherein moving said casing is accomplished by initiating the stuffing of said casing.

4. A method as set forth in claim 1 wherein solely the movement of said casing across said petal members is utilized for the step of pivoting said petal members to said casing stretching position.

5. A method as in claim 1 wherein said urging step (b) is accomplished with a bias means acting on said petal members, said bias means being weaker than the stretch strength of said casing so that said casing remains substantially unstretched prior to the step (c) of moving said casing over said contacting petal members.

6. A method as in claim 2 wherein said positioning step is accomplished by locating a stop against the exterior of said casing and forward of said petal members, and passing said casing between said stop and petal members during the stuffing of said casing so that the movement of said casing between said stop and petal members draws said petal members against said stop.

7. A method as in claim 2 wherein said positioning step is accomplished by providing said sizing means with a rigid upstanding stop forward of said petal members, passing said casing over both said petal members and upstanding stop and utilizing the movement of said casing to draw said petal members against said stop.

8. A method as in claim 7 including the step of moving said stop to a preset spaced position from said petal members prior to initiating the stuffing of said casing.

9. An expandable sizing means for implanting within an unshirred portion of casing and adapted to diametrically stretch the casing during the stuffing thereof, said sizing means comprising:
   (a) a hub for attachment about the discharge of a stuffing horn assembly;
   (b) a plurality of petal-like sizing members hinged to said hub for pivoting upwardly and forwardly from a generally reclined non-stretching position to an expanded, more upright casing stretching position;
   (c) bias means associated with said sizing members for urging said members towards said upright position and against the inner surface of the casing to be stuffed; and
   (d) said bias means being able to maintain said sizing members in contact with the inner surface of the casing during the stuffing thereof but said bias means lacking sufficient strength to move said sizing members to said casing stretching position against the stretch resistance offered by the casing, whereby the casing remains subtantially unstretched until movement of the casing over the contacting sizing members pulls said sizing members to said expanded, more upright casing stretching position.

10. An expandable sizing means as in claim 9 including a stop located forward of said petal like sizing members to prevent the pivotal movement of said members to an over-center position beyond said casing stretching position.

11. An expandable sizing means as in claim 10 wherein said stop comprises a radial member extending from about said hub.

12. An expandable sizing means as in claim 10 wherein said stop is adjustable longitudinally towards and away from said sizing members.

13. An expandable sizing means as in claim 12 wherein said stop a comprises a nut threaded to said hub.

14. An expandable sizing means as in claim 9 wherein said petal like members are arranged to form a generally conical configuration about said hub, the base perimeter of said conical configuration defining the casing engaging, expandable perimeter of said sizing means.

15. An expandable sizing means as in claim 9 wherein said bias means comprises a living hinge formed of the material of said sizing means.

16. A casing article comprising, in combination:
   (a) a shirred casing having an unshirred portion;
   (b) a plurality of petal-like sizing members disposed within said unshirred portion and arranged to pivot upwardly and forwardly from a generally non-stretching position to an expanded, more upright casing stretching position;
   (c) bias means associated with said petal-like sizing members for urging said members towards said upright position and against the inner surface of said unshirred portion of casing; and
   (d) said bias means acting to maintain said sizing members in contact with the inner surface of said unshirred portion but lacking sufficient strength to substantially stretch said unshirred portion, whereby said unshirred portion remains substantially unstretched until movement of said unshirred portion over said petal-like sizing members pulls said sizing members to said expanded, more upright casing stretching position.

17. A casing article as in claim 16, including a hub member within said unshirred portion, said hub being adapted for attachment about the discharge of a stuffing horn and said petal-like sizing members being hinged to said hub.

18. A casing article as in claim 16, including an elongated tubular member extending through the bore of said shirred casing, said petal-like sizing members being hinged to a fore end of said tubular member and said shirred casing being in gripping engagement about the outer surface of said tubular member.

19. A casing article as in claim 18 wherein said tubular member includes means for connecting the aft end of said tube to the discharge of a stuffing machine.

20. A casing article as in claim 19 wherein said tubular member is adapted to function as the stuffing horn of a stuffing machine upon connection of said aft end to said stuffing machine.

* * * * *

UNITED STATES PATENT AND TRADEMARK OFFICE
CERTIFICATE OF CORRECTION

PATENT NO. : 4,512,059
DATED : April 23, 1985
INVENTOR(S) : John H. Beckman

It is certified that error appears in the above-identified patent and that said Letters Patent is hereby corrected as shown below:

In Column 10, line 7, claim 19, change "tube" to --tubular member--.

Signed and Sealed this

Fifteenth Day of October 1985

[SEAL]

Attest:

DONALD J. QUIGG

Attesting Officer

Commissioner of Patents and Trademarks—Designate